United States Patent [19]
Weisser

[11] Patent Number: 5,659,205
[45] Date of Patent: Aug. 19, 1997

[54] HYDRAULIC TURBINE POWER GENERATOR INCORPORATING AXIAL THRUST EQUALIZATION MEANS

[75] Inventor: German Louis Weisser, Reno, Nev.

[73] Assignee: EBARA International Corporation, Sparks, Nev.

[21] Appl. No.: 584,680

[22] Filed: Jan. 11, 1996

[51] Int. Cl.[6] .................. F01D 3/00; F03B 15/00
[52] U.S. Cl. .................. 290/52; 290/43; 290/54
[58] Field of Search .................. 290/52, 54, 43, 290/1 R; 415/106, 107, 104, 132, 113; 416/157 R; 60/398; 417/365

[56] References Cited

U.S. PATENT DOCUMENTS

| | | | |
|---|---|---|---|
| 3,203,191 | 8/1965 | French | 62/613 |
| 3,383,873 | 5/1968 | Becker | 62/613 |
| 3,847,512 | 11/1974 | Brown et al. | 417/365 |
| 4,067,665 | 1/1978 | Schwartzman | 417/245 |
| 4,334,902 | 6/1982 | Paradowski | 62/614 |
| 4,362,020 | 12/1982 | Meacher et al. | 60/657 |
| 4,740,711 | 4/1988 | Sato et al. | 290/52 |
| 4,808,837 | 2/1989 | Matthias et al. | 290/54 |
| 5,009,578 | 4/1991 | Hyland | 417/365 |
| 5,127,792 | 7/1992 | Katsuta et al. | 415/104 |
| 5,591,016 | 1/1997 | Kubota et al. | 417/365 |

OTHER PUBLICATIONS

"World Pumps" No. 328, Jan. 1994, G.L. Weisser Modern Submersible Pumps for Cryogenic Liquids, pp. 23–25.
LNG 11 Conference on Jul. 4–7, 1995 at Birmingham, England, Paper 2.9, "Improvement of Natural Gas Liquefaction Processes by Using Liquid Tubines" by L.L.J. Johnson et al, pp. 1–11.

*Primary Examiner*—Steven L. Stephan
*Assistant Examiner*—Christopher Cuneo
*Attorney, Agent, or Firm*—Edward J. DaRin

[57] ABSTRACT

A sealless turbine generator mounted on a single shaft compising a radial turbine having a unique thrust equalizing mechanism mounted thereto and operative with a portion of the applied hydraulic fluid to the turbine radial runner and a thrust bearing for equalizing the generated thrust forces by providing a small axial, bidirectional movement of the thrust bearing and the elements mounted on the single shaft and an induction generator driven by the turbine. The shaft along with the induction generator and the turbine components except the turbine runner are isolated in a common housing and the entire assembly included in a submersible containment vessel having a fluid inlet and outlet for receiving the input hydraulic fluid flow at a preselected fluid pressure and velocity for controlling the speed of the turbine. The induction generator includes a variable frequency, exciting current source for the generator stator windings that permits changing the synchronous speed of the generator as required by the hydraulic fluid flow and hydraulic fluid head to permit the overall efficiency of the turbine generator to be optimized. The turbine generator is operative with liquified gases that may be utilized to lubricate and cool the thrust bearing and the induction generator by the small portion of the operative fluid utilized for operating the thrust equalizing mechanism.

19 Claims, 11 Drawing Sheets

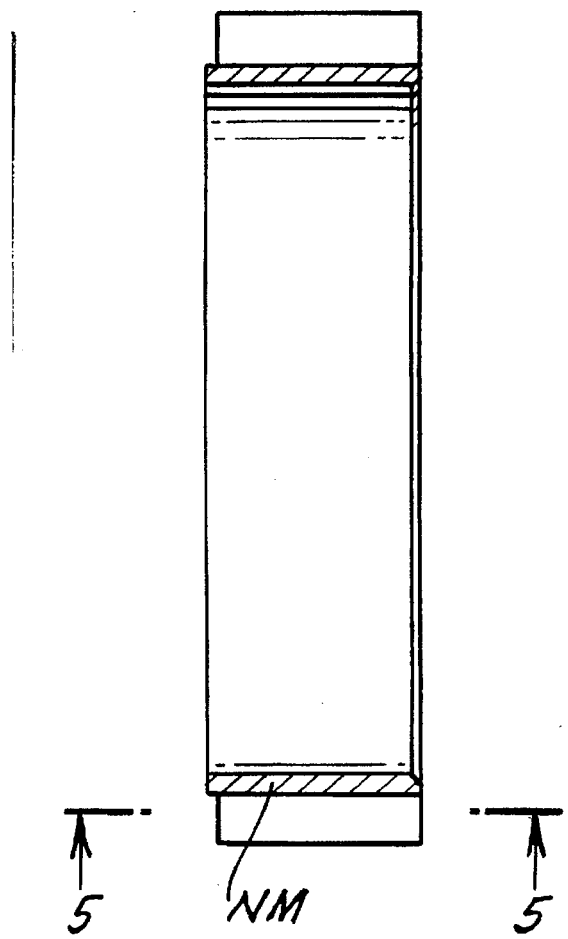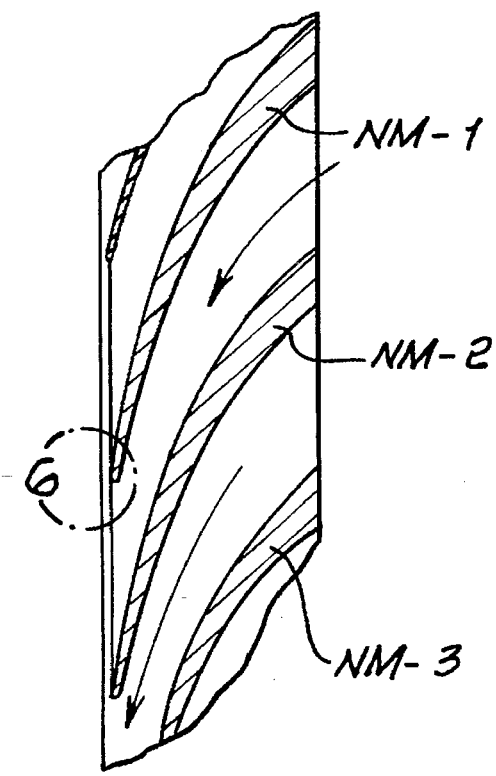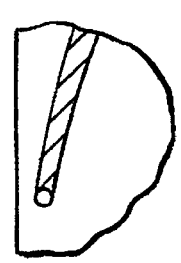

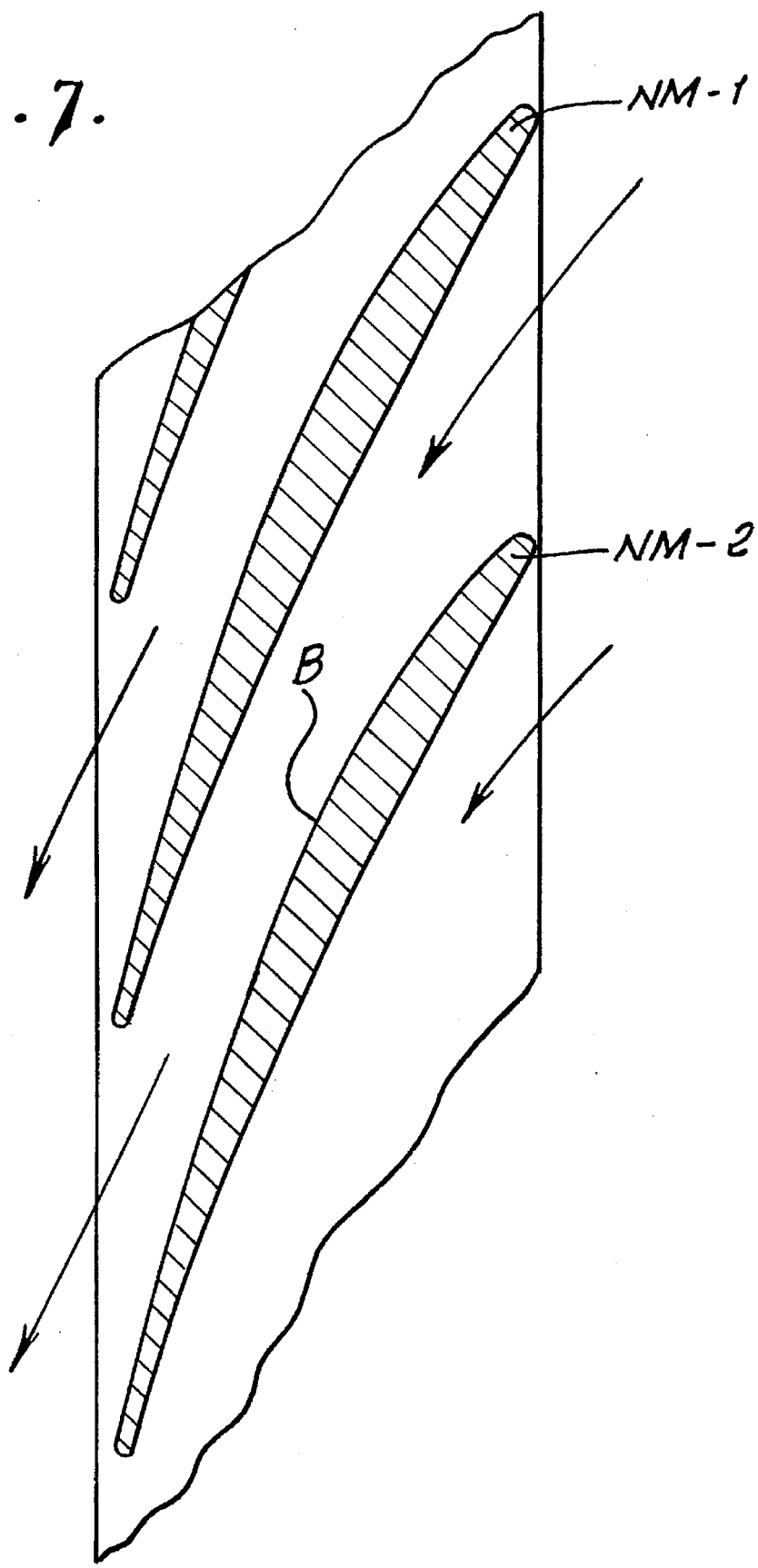

5,659,205

HYDRAULIC TURBINE POWER GENERATOR INCORPORATING AXIAL THRUST EQUALIZATION MEANS

FIELD OF INVENTION

This invention relates to hydraulic turbine power generator and more particularly to submerged hydraulic turbine generators operative with preselected hydraulic fluids.

BACKGROUND OF INVENTION

Turbine generators are known in the art for producing electrical power and are examplified by U.S. Pat. Nos. 3,203,191, 3,383,873, 4,334,902 and 4,808,837. A submerged turbine power generator is disclosed in U.S. Pat. No. 4,740,711 wherein the turbine generator is constructed in line on a single shaft in a fluid pipeline operative from the steam or gaseous fluid conveyed in the pipeline for operating the turbine and thereby the electric power generator and utilizing the pipeline flow for cooling the power generator. This disclosed patent does not address the practical problems and the solutions necessary for producing an operative system including the well known turbine thrust problem.

A related known prior art is the submersible pumps for handling cryogenic fluids such as liquefied natural gas, liquid ethylene and similar cold liquids. These types of submersible pumps are commercially available from EBARA International through its Cryodynamics Division of Sparks, Nev. The EBARA submersible pump and thrust equalizing mechanism is described in detail in the publication "World Pumps" for January 1994 on pages 23–25 by G. Louis Weisser of the Cryodynamics division of EBARA International. The disclosed pump is a centrifugal pump that is motor driven and exhibits the hydraulic thrust problem on the impeller. The Weisser publication discloses a unique solution to the thrust problem through the use of a thrust equalizing mechanism (TEM) operative through the forces generated by the pumped fluids to cause a shaft assembly to axially move bidirectionally over a limited distance to offset the thrust continuously through self-adjustment. The Weisser thrust equalizing mechanism provides the means for balancing the axial forces on the thrust bearing whereby the product lubricated thrust bearing operates at essentially "zero" thrust load over the entire usable flow range.

The existence of the thrust forces is known to be a big problem in all turbines and various solutions have been attempted. One such solution is disclosed in U.S. Pat. No. 4,362,020 for a Hermetic Turbine Generator. The turbine shaft is arranged in a vertical orientation with the turbine and electric power generator mounted on a single shaft that is supported on a hydrodynamic fluid film bearing generated from the process fluid. A complicated mechanism is disclosed to eliminate the thrust problem through the use of a thrust runner and bearing plates. This is not the thrust equalizing mechanism or the equivalent disclosed in the above identified publication of Weisser.

Although the Weisser thrust equalizing mechanism has been used and known in the art for use with submersible pumps no use of this elegant solution to the thrust forces in a hydraulic turbine are presently known.

SUMMARY OF INVENTION

The present invention provides an improved hydraulic turbine electrical power generator that is operable as a submerged hydraulic turbine electrical power generator that has a long life, seal-less, submerged turbine generator that functions very well and may be readily adjusted for optimum efficiency in operation and includes a self-limiting runaway speed by balancing out the pressures generated by the centrifugal forces in the turbine against the input hydraulic fluid flow pressure. This later feature is very important for submerged turbine generators due to the fact there is no way to stop the turbine in the event it reaches runaway speeds. The turbine is further provided with a unique thrust equalizing mechanism utilizing a portion of the input fluid flow to balance the generated thrust forces as well as utilizing the portion of the input fluid flow to lubricate the ball bearing for the turbine and cooling the electric power generator.

The thrust equalizing mechanism for the turbine utilizes the prior art thrust equalizing mechanism (TEM) developed by G. L. Weisser for submersible pumps for cryogenic liquids and adapted for use in a turbine by mounting the ball bearing to traverse small, bidirectional movements of the shaft assembly for balancing out the generated thrust forces.

The preferable orientation of the hydraulic turbine generator is in a vertical orientation to achieve one hundred per cent balancing of all forces whereby the overall efficiency of the turbine generator is optimized.

The electric power generator is preferably in the form of an induction generator having a rotor and a stator exciting winding controllable to provide varying synchronous speeds for the generator and thereby permits the frequency of the exciting current for the generator to be uniquely varied to produce a preselected output frequency from the generator despite the variations of the input hydraulic fluid pressure and flow as well as varying the pressures generated by the centrifugal forces of the turbine without resorting to the use of adjustable guide vane assemblies or the like for the turbine runners. The hydraulic turbine generator is assembled on a single shaft mounted between a pair of ball bearing without any dynamic seals between the turbine generator and the environment.

From a structural standpoint, the present invention comprehends a single shaft assembly having a hydraulic turbine and an electrical power generator in the form of an electrical induction generator mounted on opposite sides of a ball bearing with a radial bearing mounted to one end of the shaft on the outside of the electrical power generator. The power generator has a rotor mounted to be rotatable with the shaft rotations and axially movable therewith and arranged with a stator having an exciting electrical winding that is excitable from an A.C. source providing electrical signals of varying frequencies for varying the synchronous speed of the power generator as required by the flow and head of the input hydraulic turbine that produce variable speeds to produce a constant frequency output from the generator.

The hydraulic turbine is a radial turbine having the thrust equalizing mechanism operable with the turbine radial thrust equalizing runner for balancing out the thrust forces through the small axial, bidirectional movements designed into the single shaft and ball bearing therefore.

BRIEF DESCRIPTION OF THE DRAWINGS

These and other features of the present invention may be more fully appreciated when considered in the light of the following specification and drawings, in which:

FIG. 4 is a cross-sectional view of a detached nozzle assembly for injecting high velocity hydraulic fluids into the turbine runner of FIG. 1;

FIG. 5 is a developed section of the nozzle vanes taken along the line 5—5 of FIG. 4;

FIG. 6 is an enlarged view of the vane end taken at the circle 6 of FIG. 5;

FIG. 7 is a partial enlarged nozzle vane profile of the nozzle vanes of the nozzle assembly;

DETAILED DESCRIPTION OF THE PREFERRED EMBODIMENT OF THE INVENTION

Figure 1:
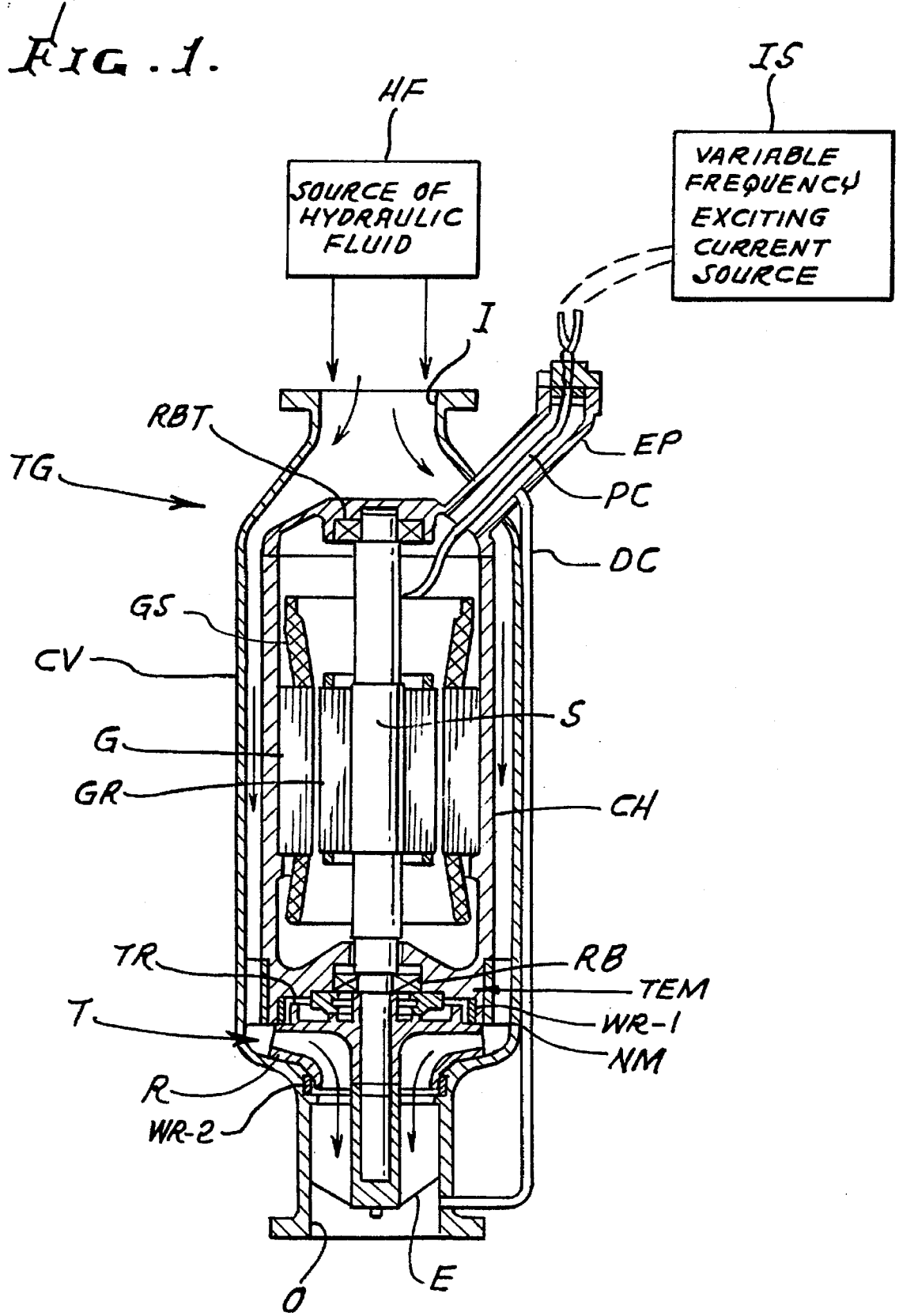
FIG. 1 is a cross-sectional view of a submerged hydraulic turbine electrical power generator embodying the present invention.

Now referring to the drawings, the hydraulic turbine-electrical power generator TG of the present invention will be described in detail. The hydraulic turbine-electrical power generator TG is illustrated in the drawings and will be described as a submerged hydraulic turbine generator TG to be operative in response to preselected hydraulic fluids coupled to the turbine T and the electrical power generator G, both mounted on a single shaft S. Accordingly, the terms "hydraulic fluids or hydraulic fluid flow" as utilized in the present invention as an operative hydraulic fluid useful for operating the turbine T and cooling the electrical power generator G is an electrically non-conductive fluid, including cryogenic liquefied gases, such as liquefied natural gas, liquefied methane gas, liquefied ethylene gas, liquefied petroleum gas and similar liquefied hydrocarbons. The source of hydraulic fluid HF provides the selected hydraulic fluid at a varying or constant pressure and velocity such as may be obtained from wells, etc.

The turbine T and the electrical power generator G are mounted on the shaft S to be rotatable in unison therewith upon the application of a hydraulic fluid flow to a runner R for the turbine T for causing the shaft S to be rotatable counter-clockwise, as illustrated, in response to the hydraulic pressure and velocity of the applied hydraulic fluid. The turbine T is provided with a ball bearing RB, further identified in FIG. 1 as the lower bearing, arranged to be operative with the runner R, further identified in the drawing as the thrust equalizing runner R. The shaft S is also provided with a second ball bearing characterized as the top radial bearing RBT mounted to the top end of the shaft S which has a portion of a reduced diameter from the adjacent portion of the shaft. The opposite end of the shaft S from the top bearing RBT is provided with an exducer E mounted adjacent the turbine runner R for receiving the hydraulic fluid discharged from the runner. The exducer E is mounted to be rotatable in unison with the rotations of the shaft S. This arrangement of components can be considered to be the "shaft assembly", for convenience, since they are rotated at the speed of the shaft S and axially movable with the bidirectional movements imparted to the shaft S and the ball bearing RB. The illustrated turbine T is illustrated as including a thrust equalizing mechanism TEM, to be described more fully hereinafter. The shaft S is mounted vertically as the preferred orientation to permit balancing of all of the forces.

The above shaft assembly is housed within a common housing CH for enclosing and isolating the components of the shaft assembly and the lower portion of the shaft S are all located within the common housing CH except for the turbine runner R and the remaining portion of the shaft S including the exducer E. As illustrated in FIG. 1, the housing CH completely encloses the components of the shaft assembly above the turbine runner R. The common housing CH is submerged in a containment vessel that encloses the entire hydraulic turbine-electrical power generator TG in a spaced relationship with the common housing CH. The containment vessel CV is provided with a hydraulic fluid inlet opening I adjacent the inlet flange identified in FIG. 1. The source of hydraulic fluid HF shown as a block is coupled to the vessel CV at the inlet flange. The vessel CV is also provided with a hydraulic fluid outlet opening O adjacent the lower end of the shaft S and adjacent the identified outlet flange for receiving the hydraulic fluids discharged from the exducer E. The hydraulic fluids coupled from the source HF to the vessel CV are caused to flow into the fluid inlet I and around the common housing CH, as illustrated. The space between the housing CH and the containment vessel CV is provided with nozzle means NM mounted between the housing CH, opposite the housed turbine T, and the vessel CV for discharging the hydraulic fluid to impinge on the radial turbine runner R. When the hydraulic fluid is discharged from the turbine runner R, it is coupled to the exducer E and from the exducer out of the vessel CV by means of the outlet O.

The common housing CH is constructed with an electrical power line channel EP in communication with the inside of the housing CH and passing through the wall of the vessel CV and extending outwardly of the vessel. The channel EP is closed at the end as illustrated and identified in FIG. 1 as a cryogenic electrical penetration. For this purpose an electrical power cable PC is connected to the power generator G and runs through the channel EP to the top end thereof and through the identified cryogenic electrical penetration whereby the output lead wires of the cable PC are exposed for external coupling or connection to the electrical power output generated by the generator G to a preselected utilization means. The same cable lead wires are used to connect the variable frequency exciting current source for the generator stator GS, as will be explained further hereinafter. The channel EP is connected to a hydraulic fluid discharge conduit DC for receiving the portion of the input hydraulic fluid conveyed past the generator G and is terminated adjacent the low pressure end of the vessel CV, adjacent the outlet flange and spaced from the end of the exducer E. This discharge conduit is further identified as the "Generator Coolant & Thrust Equalizing Mechanism Liquid Discharge Line" in FIG. 1.

With the above description of the over-all assembly of the hydraulic turbine-power generator TG in mind, the detailed construction of the hydraulic turbine T will commence. As those skilled in the turbine art appreciate, all turbines have the problem of overcoming the thrust forces. The solution to the balancing out or equalizing the thrust forces in accordance with the present invention is by adopting the thrust equalizing mechanism TEM that I disclosed in the aforementioned "World Pumps" publication for use with submersible centrifugal pumps for cryogenic liquids. Although it is known that centrifugal pumps can be operated in a reverse direction and used as a turbine, it is not "obvious" to those skilled in the art that the thrust equalizing mechanism useful for centrifugal pumps is directly applicable to a hydraulic turbine. Because of the perceived problems, as seen by those skilled in the art, in using the TEM in a turbine it was considered doubtful to achieve or to be inoperative. One of the perceived problems in a turbine operation is the generation of centrifugal forces at the turbine runner that would prevent the direct adoption in a hydraulic turbine my solution to the thrust forces in centrifugal pumps. Tests have been heretofore conducted to determine the operability of the TEM pump solution to a hydraulic turbine and conclusively proved that a turbine could be so operated by my prior art thrust equalizing mechanism.

The turbine T employs a radial runner R for receiving the hydraulic fluid flow from the nozzle means NM and turns the fluid flow approximately 90 degrees in accordance with the shape of the fluid flow path through the runner R, as is evident from viewing FIG. 1. The fluid flow received at the runner R is at a relatively high velocity as a result of the conversion of the applied fluid pressure to a high velocity stream as a result of the configuration of the nozzle vanes provided for the nozzle means NM by the present invention. To this end, the nozzle means NM is provided with eleven, equally spaced nozzle vanes as illustrated in FIGS. 4–7. The nozzle means NM is constructed and defined to receive the high pressure hydraulic fluid flow from the source of hydraulic fluid HF coupled to the containment vessel and flowing therethrough. As illustrated in FIGS. 5 and 7, in particular, the nozzle vanes define a plurality of fluid flow paths through the nozzle means NM by the specially designed vanes and their spacing wherein they function as nozzle vanes. The conveyed high pressure fluid flow is received by the nozzle means NM at each fluid flow path at their entry end wherein the spacing between vanes, such as vanes NM-1, NM-2 and NM-3 illustrated in FIG. 5, gradually decrease the area of the fluid flow path as it traverses the path from the entry end to the discharge end of the nozzle means NM, as illustrated. The complete profile of the vanes NM-1 and NM-2 is specifically illustrated in FIG. 7. The straight side of the vane NM-1 defines one fluid flow boundary for a fluid flow path while the adjacent fluid flow boundary B is defined by the adjacent shape of the vane NM-2, from end to end as seen in FIG. 7. To this end, the vane thickness of vane NM-2 gradually and smoothly increases in cross-section from its entry end for gradually decreasing the adjacent flow path area and then decreases in thickness, gradually, as the flow path approaches the exit end of the adjacent vane NM-1 and continues to decrease until the vane NM-2 reaches its terminal or exit end. This flow path, then, functions to convert the high pressure input hydraulic fluid to a high velocity stream of hydraulic fluid by well known hydraulic fluid dynamic principles. The ends of each vane is shaped with a preselected radius for optimizing the hydraulic performance of the nozzle vanes and the shape of the exit end of the vanes is illustrated in FIGS. 6 and 7. The eleven nozzle vanes NM are all similarly shaped and oriented for defining the plurality of fluid paths to accelerate the fluid flow therein to convert the received portions of the high pressure fluid to a high velocity stream. The high velocity streams discharged from the nozzle means NM are discharged immediately adjacent the fluid entry end of the turbine runner R.

At this point, it should be noted that the input hydraulic fluid flow provided by the source of hydraulic fluid source HF has a variable flow rate and high pressure and is converted to a high fluid velocity. As is known, fluid pressure directly depends on the fluid head and specific gravity of the selected operative fluid or expressed mathematically as:

$$\text{FLUID PRESSURE} = (\text{FLUID HEAD}) \times (\text{Specific Gravity of fluid})$$

The present invention then, uniquely varies the speed of the turbine T to optimize the effeciency of the turbine over the entire usable hydraulic fluid range and no presently known, prior art discloses imparting variable speed to a hydraulic turbine. The speed of a turbine is controlled by the hydraulic pressure of the fluid and the velocity of the fluid flow, without resorting to the use of adjustable runner vanes and/or inlet adjustable guide vanes.

Figure 11:
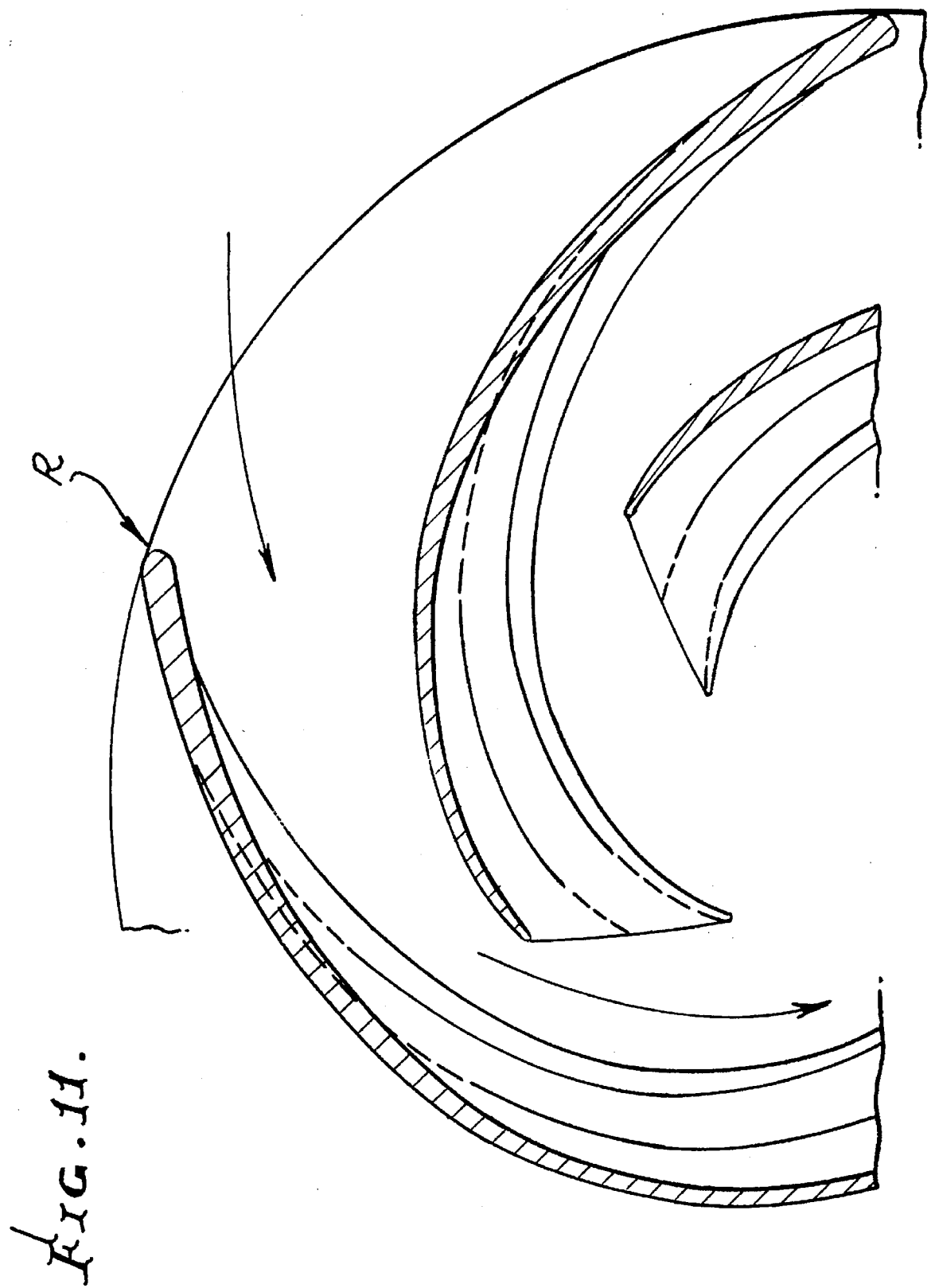
FIG. 11 is a partial view of a plurality of runner vanes profile for the runner of FIG. 8.
Figure 12:
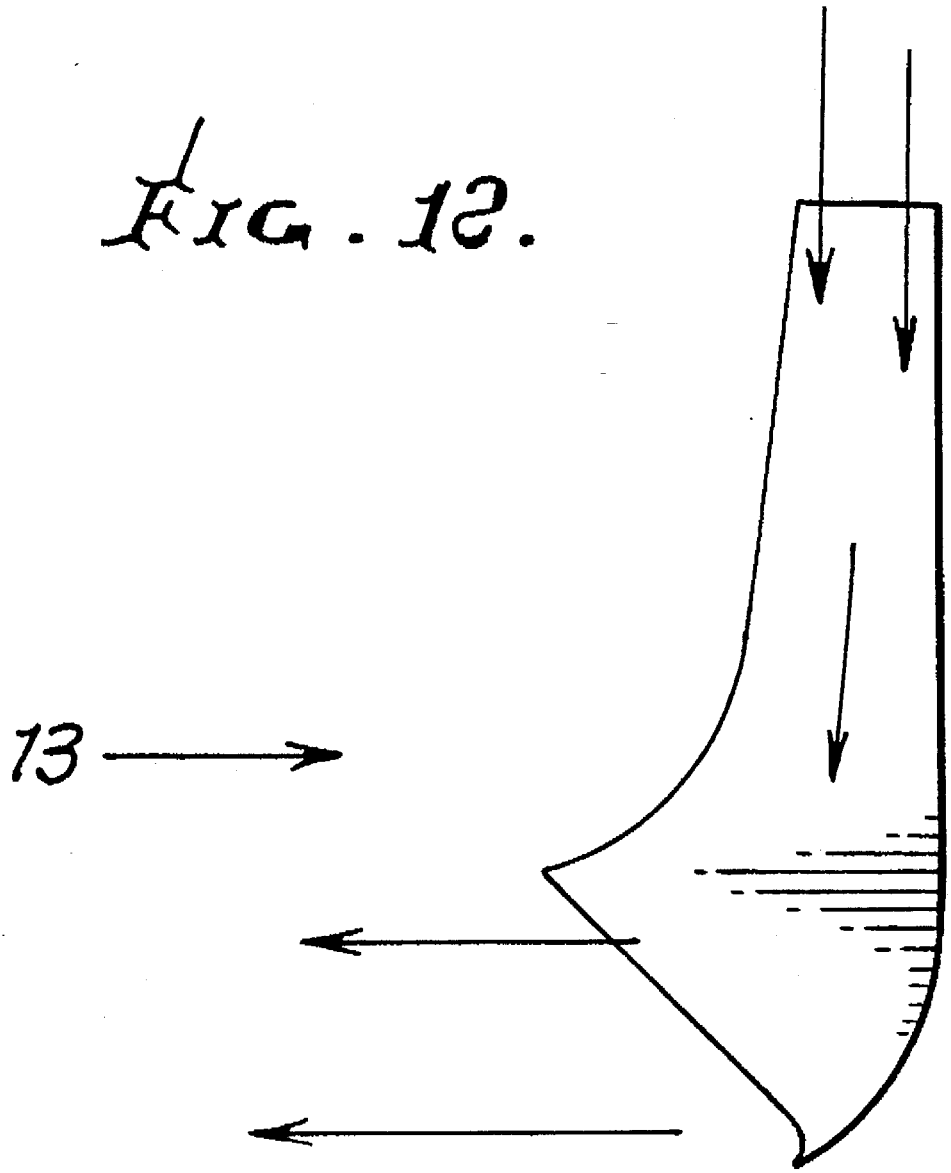
FIG. 12 is a profile of a single vane for the runner of FIG. 8.
Figure 13:
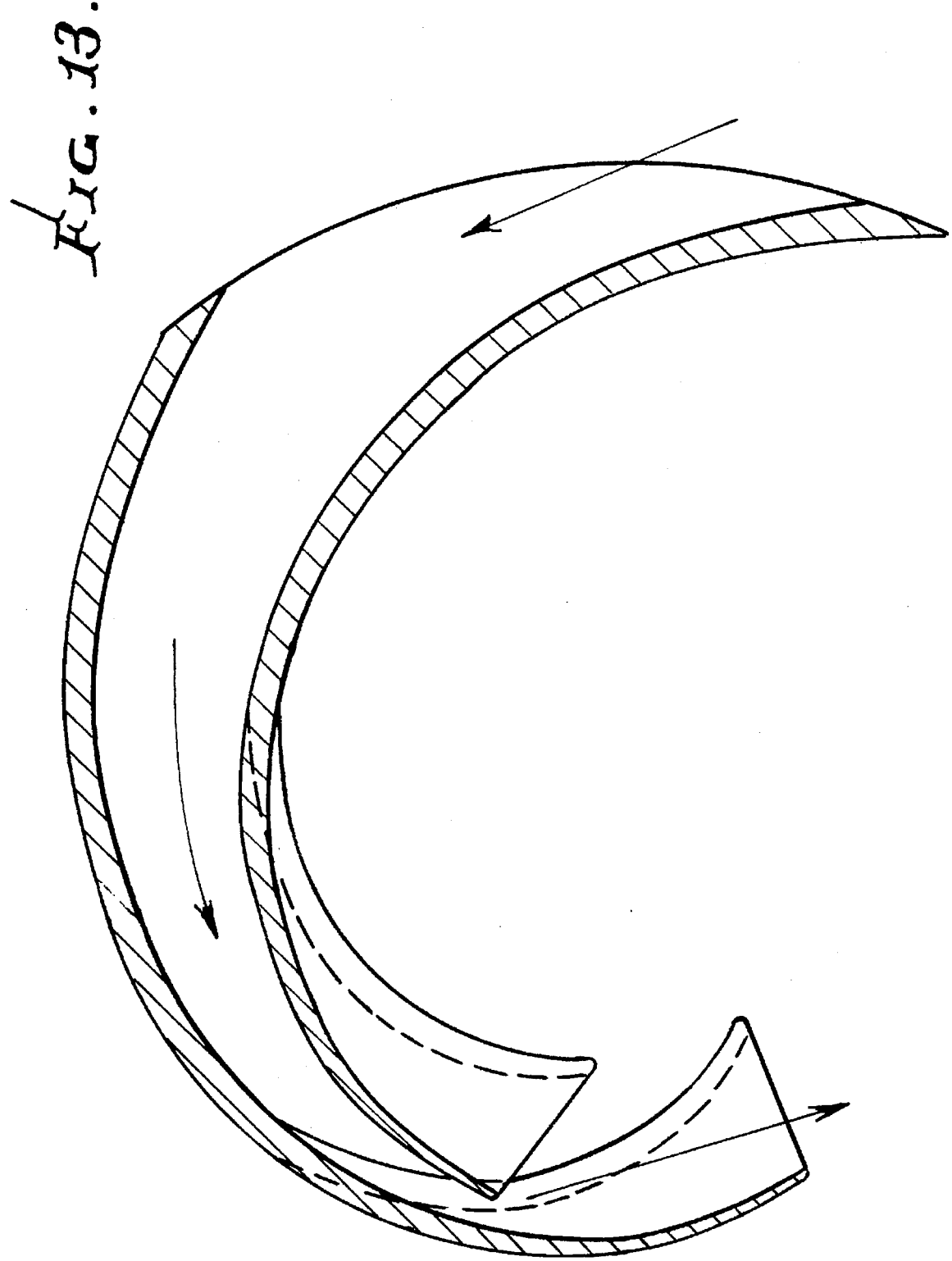
FIG. 13 is a view of the vane taken in the direction of the arrow 13 of FIG. 12.

The turbine runner R is constructed and defined as a radial runner provided with six equally spaced, fixed runner vanes having profiles as illustrated in FIGS. 11–13. Unlike the prior art construction of turbine runner vanes, the runner vanes are fixed and are not internally or externally adjustable for changing the velocity or direction of the hydraulic fluid passing through the adjustable fluid flow paths defined between the runner vanes.

The turbine runner R fluid flow paths are illustrated in FIGS. 11–13. One complete fluid flow path is shown in FIG. 13. As noted in FIG. 13, in particular, the fluid flow path is defined between a pair of vanes and the vanes are oriented for providing a large entry area leading to a restricted zone and expanding into a discharge area while continuously rotating the flow path through approximately 90 degrees whereby the received fluid flow is discharged from the runner R at a relatively low pressure and velocity. Due to the fact that the runner is spinning in response to the application of the hydraulic fluid the discharged flow of the fluid exits the runner R substantially axially thereto and spinning, in a combination of the radial and axial flow. The walls of the vanes are substantially the same cross-section through-out except adjacent the fluid entry end wherein it is larger in cross-section at the fluid exit end, as is illustrated. The fluid flow path between the vanes is illustrated in the drawings and is best seen in FIG. 13 wherein the fluid enters at the large end or the right hand side of FIG. 13 and follows the spiral path of approximately 90 degrees and is discharged beyond the restriction defined by the adjacent vane.

Figure 14:
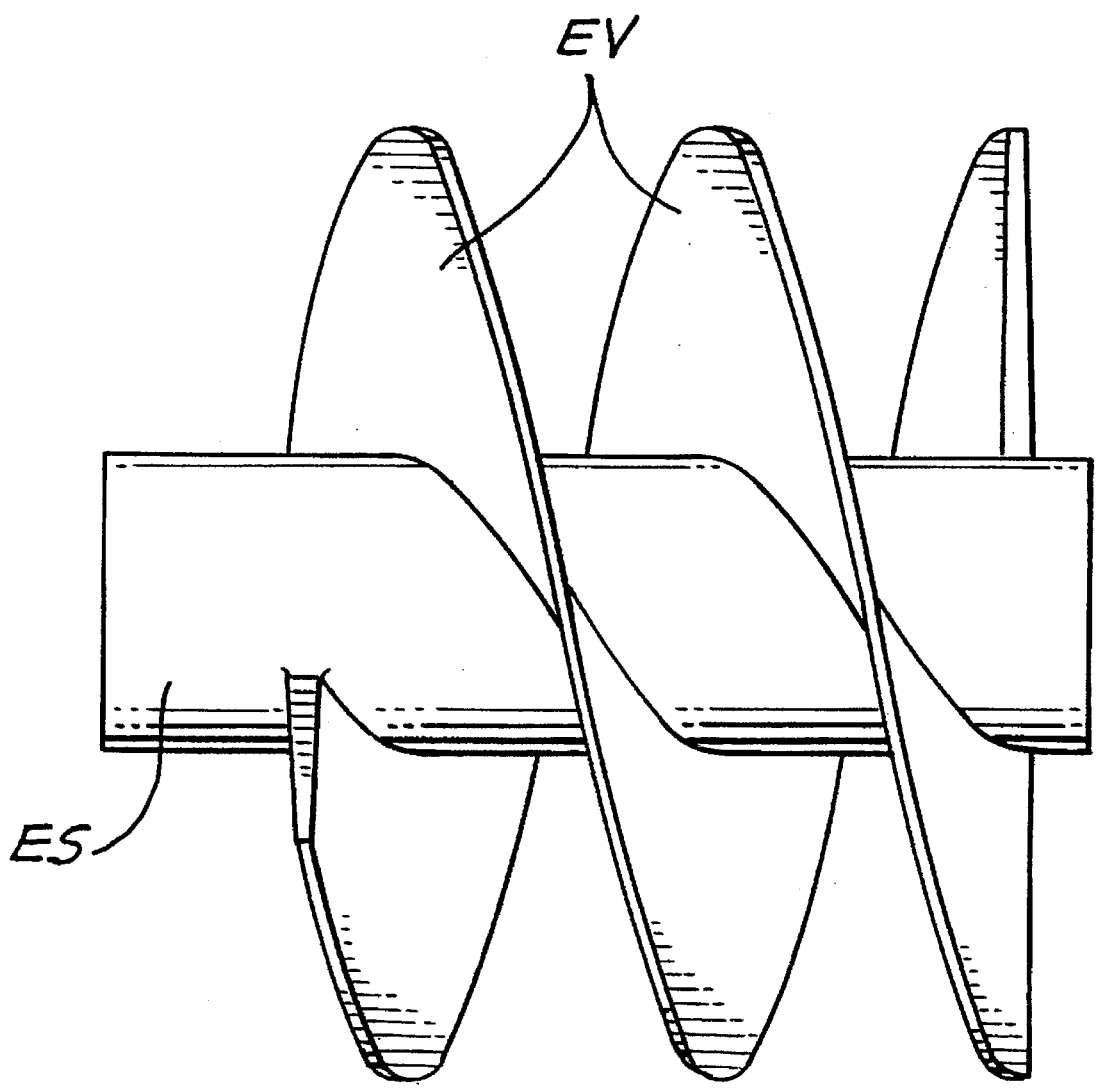
FIG. 14 is a side elevational view of the exducer for the turbine of FIG. 1.
Figure 15:
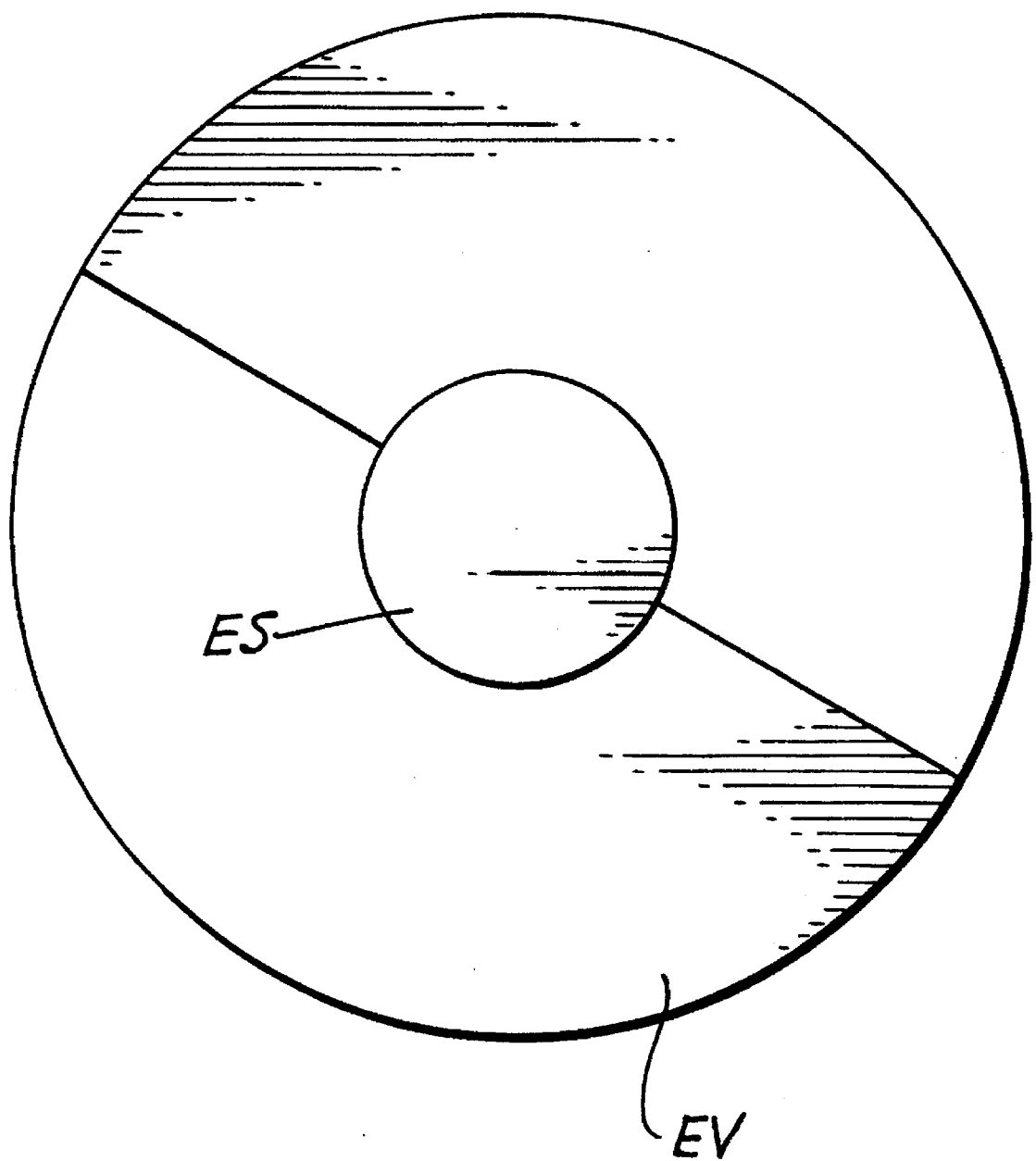
FIG. 15 is a lefthand view of the exducer as illustrated in FIG. 14.

The spinning axial fluid flow from the runner R is delivered to the exducer E mounted to be rotatable with the shaft S. The details of the exducer E are illustrated in detached form in FIGS. 14 and 15. As can be appreciated from examining FIG. 14 the exducer shaft ES is constructed and defined with two spiral vanes EV spaced 180 degrees apart. Accordingly, the spin imparted to the hydraulic fluid at the runner R is straightened out by the interaction with the spinning vanes EV and discharged as an axial flow from the exducer E and thereby from the vessel CV. Although it is known to use an inducer of a spiral configuration at the fluid entry end of submersible pumps, it is not deemed obvious to use such a structure at the discharge end of a hydraulic turbine-power generator as described herein.

Figure 8:
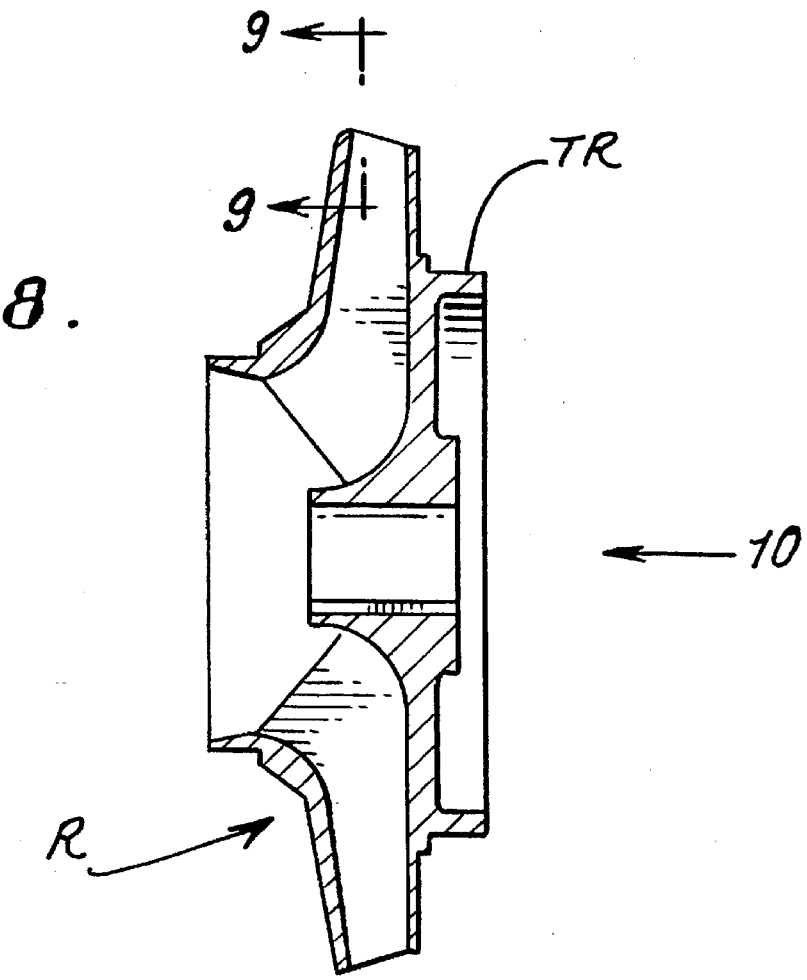
FIG. 8 is a detached, cross-sectional view of the thrust equalizing runner for the turbine of FIG. 1.
Figure 9:
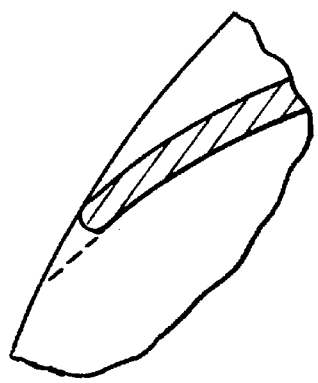
FIG. 9 is a partial cross-sectional view of the runner taken along the line 9—9 of FIG. 8.
Figure 10:
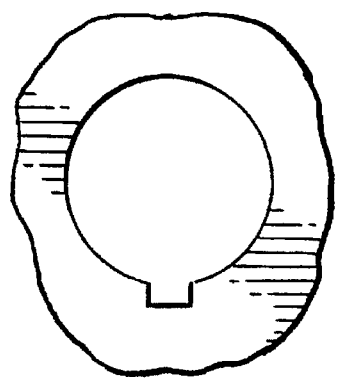
FIG. 10 is a partial end view taken in the direction of the arrow 10 in FIG. 8.

For the purpose of the thrust equalizing mechanism TEM a throttling ring is formed integrally with the top side of the runner R as mounted in FIG. 1. The throttling ring TR is best viewed in FIG. 8 and is defined by the axially extending ring defined adjacent the outer ends of the runner R. The throttling ring TR coacts with a thrust plate TP secured to the bottom side of the housing CH as illustrated in FIG. 1. The thrust equalizing mechanism is operative through two orifices defined by the throttling ring TR and the thrust plate TP upon application of the operative hydraulic fluid flow to the runner R. The thrust equalizing mechanism TEM is illustrated in FIG. 1 in the starting position of the turbine T or before the application of the hydraulic fluid thereto. The runner R has the throttling ring TR mounted adjacent a first wearing ring WR-1 secured to the dependent portion of the common housing CH. A second wearing ring WR-2 is secured to the vessel CV adjacent the discharge end of the runner R. The diameter of the wearing ring WR-1 is selected to be greater than the diameter of the wearing ring WR-2 and this offset produces a thrust force in the upward direction, as viewed in FIG. 1. The arrangement and construction of the runner R, wearing ring WR-1 and integral throttling ring TR is designed to permit a small portion of the hydraulic fluid discharged from the nozzle means NM to be conveyed between the wearing ring WR-1 and the adjacent axially extending the throttling ring portion in its flow path towards the runner R. This small portion of hydraulic fluid is used to operate the thrust equalizing mechanism TEM.

Figure 2:
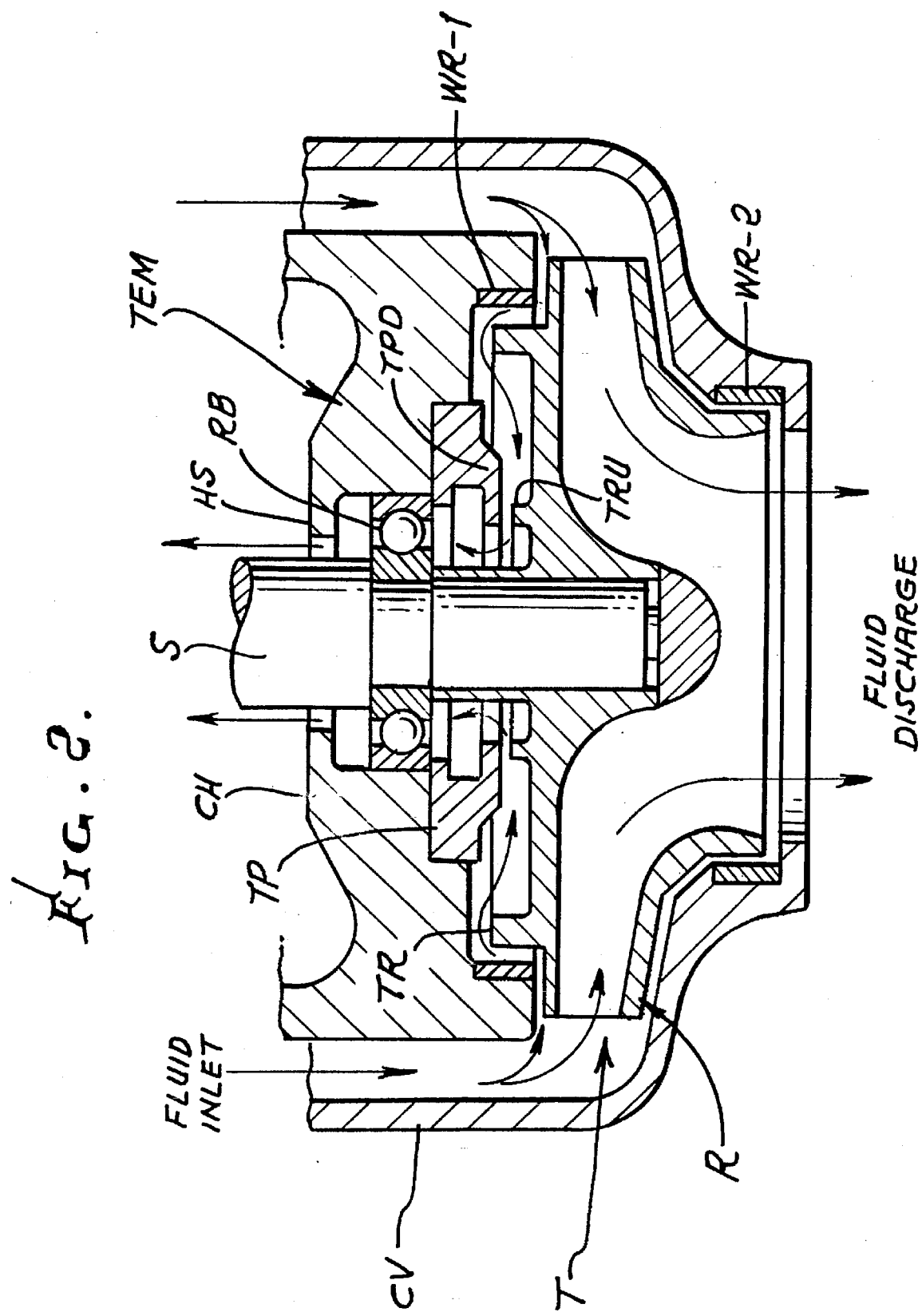
FIG. 2 is a partial view of the fluid outlet end of the turbine of FIG. 1 and illustrating the thrust equalizing mechanism having its variable orifice open and illustrating the hydraulic fluid flow through the turbine runner, thrust equalizing mechanism and ball bearing.

Now referring to FIGS. 2 and 3 the detailed operation of the thrust equalizing mechanism TEM by reference to the enlarged assembly views illustrated will be explained. Important to this operation is the manner in which the ball bearing RB is mounted to the shaft S. The bearing RB has an inner race secured to the shaft S as a part of the aforementioned shaft assembly. The outer race of the bearing RB is mounted loosely against the housing CH and allows the shaft assembly to move axially, bidirectionally, a preselected amount for balancing out the generated thrust forces. The housing CH is provided with a housing stop HS, normally spaced from the bearing RB, (see FIG. 1). The thrust plate TP is secured to the bottom side of the housing CH (see FIG. 1) and is provided with a dependent portion TPD overlying the throttling ring TR adjacent the axial upstanding portion TRU of the throttling ring TR, normally in a spaced relationship. The axial height of the throttling ring portion TRU is less than the height of the axial ring portions coacting with wearing ring WR-1. The thrust equalizing mechanism TEM consists of two orifices for receiving the coupled hydraulic fluid in series through the flow path defined between the throttling ring TR and the bottom of the housing CH. The first orifice can be considered a "fixed" orifice and is defined between wearing ring WR-1 and the adjacent portion of the throttling ring TR for conveying a portion of the hydraulic fluid between these two elements and into the second or "variable" orifice. The second orifice is defined between the bottom face of the thrust plate portion TPD and the top face throttling ring portion TRU. The variable orifice resembles a gap between the throttling ring TR and the thrust plate TP that varies in size in accordance with the axial movements of the shaft assembly. The lower bearing RB clearance with the stop member HS is designed to be approximately the same size as the variable orifice gap upon start-up. The specific location of the upper wearing ring WR-1 relative to the lower wearing ring WR-2 is very important to create a thrust force acting in the upward direction, as viewed in FIGS. 1 and 2.

With the above construction of the thrust equalizing mechanism TEM in mind the operation of the mechanism will be explained in detail. Initially the total energy of the turbine T is available at the turbine inlet I. After the input fluid is conveyed through the nozzle means NM and prior to entering the runner R, this total energy is available minus the energy required at the nozzle means NM for changing the high fluid pressure to a high velocity fluid stream. The fluid leakage through the front shroud of the runner R is of no importance. The fluid leakage through the back shroud becomes the main source of energy to operate the mechanism TEM. Under these conditions, the hydraulic pressure distributions along the shroud of the runner R initially produces a thrust force in the upward direction, as mentioned hereinabove. The upward thrust force causes the shaft assembly to move axially upwardly and this condition of the thrust equalizing mechanism TEM is illustrated in FIG. 2. The portion of the inlet fluid conveyed through the fixed orifice continues into the variable orifice and travels through the lower bearing RB into the common housing CH and past the generator G and through the channel EP; (see FIG. 1). In this fluid flow path the lower bearing RB is lubricated and cooled and the electrical generator G is cooled. This "coolant" liquid must be returned to the low pressure outlet side of the turbine T for the TEM operation and this is provided by the conduit DC running between the channel EP and the low pressure end of the turbine T, as seen in FIG. 1. With the continuous axial movement of the runner R upwardly in response to the generated thrust force, the variable orifice continuously decreases in size until the thrust plate portion TPD engages the ring portion TRU as illustrated in FIG. 3. This arrests the upward travel of the shaft assembly. The initial gap or size of the variable orifice is much larger than the fixed orifice at the start of the turbine operation since the fixed orifice is defined by the clearance between the wearing ring WR-1 and the throttling ring TR.

Figure 3:
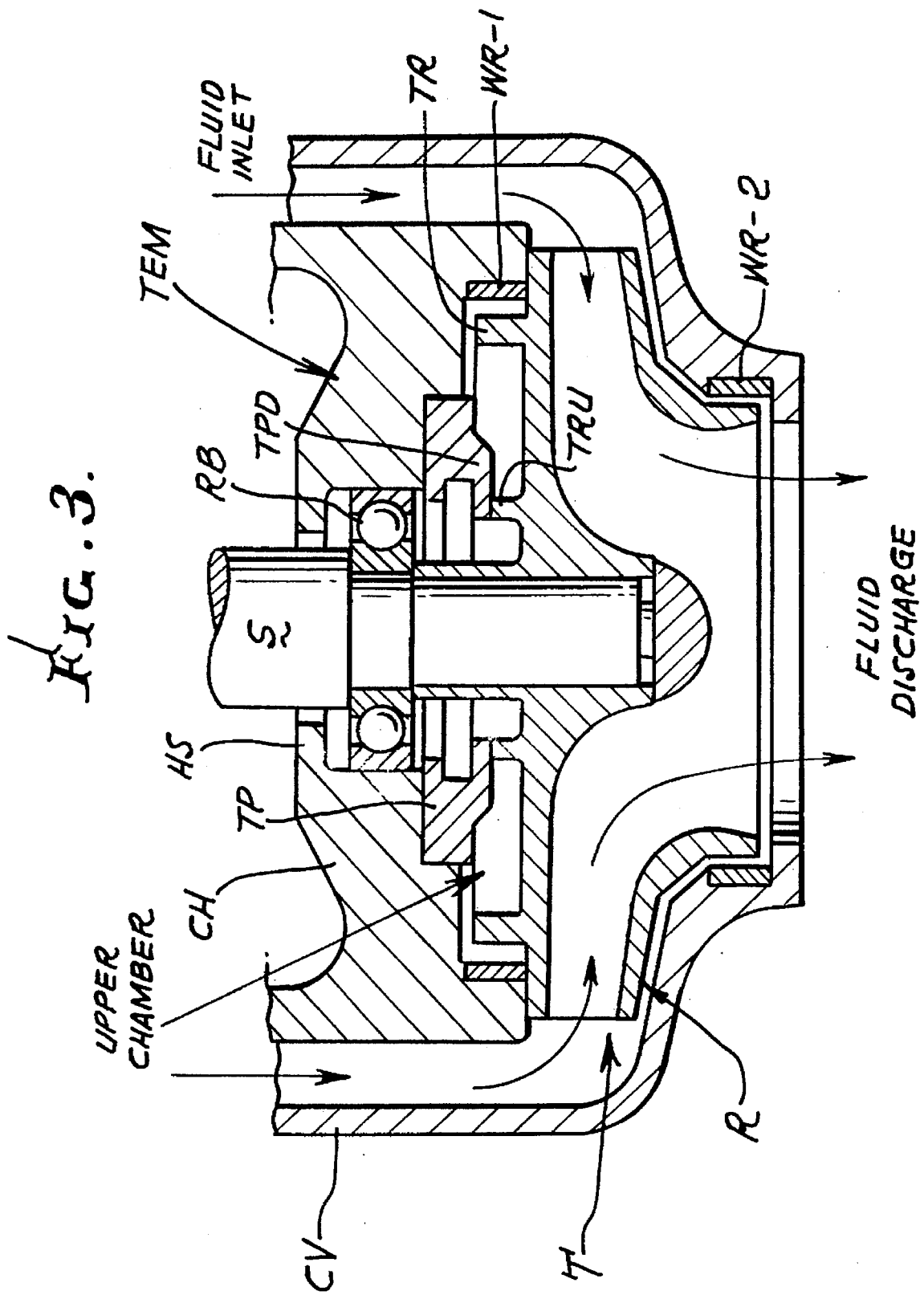
FIG. 3 is a partial view of the fluid outlet end of the turbine of FIG. 1 and illustrating the thrust equalizing mechanism having its variable orifice closed and illustrating the shaft moved away from its starting position and further illustating the hydraulic fluid flow through the turbine runner.

When the shaft assembly has completed its upward travel, the fluid passing into the variable orifice is throttled as is evident from FIG. 3. This throttling action causes the fluid pressure to build up in a chamber defined between the closed variable orifice and wearing ring WR-1 identified in FIG. 3 as the upper chamber. The pressure build up in the upper chamber counteracts the thrust force created by the offset of the wearing rings WR-1 and WR-2 and therefore leads to a downward movement of the shaft assembly. The downward travel of the shaft S causes a gap to be produced at the variable orifice resulting in the dumping of the pressure built up in the upper chamber causing the reverse axial travel of the shaft assembly. The reverse travel of the shaft assembly continues until the created thrust forces are dominant, once again, and the upward movement resumes. These alternate shaft movements continue during turbine operation thereby equalizing the thrust forces created in the trubine. The thrust equalizing mechanism TEM is now appreciated to function as a thrust bearing by the combination of the lower ball bearing RB and the hydraulic cushion provided during the operation of the thrust equalizing mechanism. The lower bearing RB is particularly useful for start-up and shut down of the turbine generator. Due to the incompressible hydraulic fluid utilized in thrust equalizing mechanism TEM, good damping conditions are created and the adjustments and balancing of the thrust forces occur gradually, smoothly and without overshoot.

The operation of the turbine T will now be further considered. It must be recognized that the runner R operation generates centrifugal forces and the centrifugal forces that prevail are dependent on the rotary speed of the runner R. For proper operation then, the hydraulic fluid forces impinging on the runner R must first balance out these generated centrifugal forces and secondly be sufficient for rotating the shaft S at a preselected speed. Recognizing this centrifugal force problem of radial turbine runners, the centrifugal forces generated by the runner R can be balanced out by controlling the input hydraulic pressure to be 10 to 20% higher in pressure than when these forces are absent. Accordingly, the hydraulic fluid source HF provides hydraulic fluid at a high enough pressure to overcome the centrifugal forces and generate sufficient torque at the runner R to impart the desired rotary speed to the shaft S. For any given hydraulic fluid the fluid pressure can be varied by varying the head therefore, for example. It should also be noted that the generated centrifugal forces can be adjusted by reducing the desired speed imparted to the shaft S. As will be noted hereinafter, the exciting frequency coupled to the generator stator GS can be changed to compensate for the reduced speed of the turbine and thereby the generator speed. The use of a radial runner R for the turbine T in accordance with the present invention wherein centrifugal forces are generated results in the turbine having a self-limiting runaway speed by balancing out the centrifugal forces in the runner R against the input fluid pressure. Axial turbines have no self-limiting runaway speeds since the increase in flow rate increases the runaway speed. This self-limiting feature is of particular importance for submerged turbine generators, since there is no way to stop the turbine in a runaway condition. This requirement then eliminates the use of axial or half-axial runners in submerged turbine generators of the type of the present invention. This type of radial runner is compatible with the use of the hydraulic fluids described hereinabove. With the application of the input hydraulic fluid to the turbine T, the shaft is rotated and the thrust equalizing mechanism TEM is operative as described hereinabove. Due to the use of a single shaft S, the turbine speed is also the speed of the generator G. The preferred orientation of the turbine generator is the vertical orientation, illustrated in FIG. 1, since all 100% of the forces are balanced out unlike horizontal orientation and operation.

The presently preferred form of electrical power generator utilized in the present invention is an induction generator. AS is well known, an induction generator is an induction motor that is driven above its synchronous speed while connected to a power source and hence the mechanical power applied to the motor shaft is converted into electrical power. When the induction motor is driven above synchronous speed, the slip becomes negative. The rotor conductors then cut the magnetic flux of the rotating field of the stator in a direction opposite to that which occurs when the machine operates as a motor. By transformer action these rotor currents induce currents in the stator that are substantially 180 degrees out of phase with the energy component of the stator current that existed when the machine operated as a motor. The greater the torque that is applied to the generator shaft, in this instance, the turbine T, the greater is the resulting electrical output power from the induction generator.

The induction generator G is illustrated in FIG. 1 has its generator rotor GR mounted to the shaft S to be rotatable therewith at the speed imparted to the shaft by the turbine T. The generator G has its stator winding GS mounted in a spaced relationship around the rotor GR. In accordance with the present invention the generator stator windings GS are connected to the variable frequency, exciting current source IS whereby the frequency of the generated rotating magnetic field of the stator can be varied. For this purpose, the variable frequency exciting current source IS is a commercially available unit that is characterized as a variable speed, constant frequency controller. The source IS is provided to permit the output power to be at a preselected constant frequency to compensate for the variable output frequencies generated by the generator G due to variable speeds imparted to the shaft S and thereby the turbine T and the generator G. The commercial unit is constructed and designed for sensing the shaft speed of the generator G and computing the necessary frequency for the exciting current to be coupled to the stator windings GS for obtaining the desired constant output frequency of the power output from the generator G. For example, if the turbine speed is reduced to reduce the centrifugal forces, the exciting frequency of the current coupled to the stator windings GS is varied to compensate for the reduced turbine speed and yet provide a constant frequency output. The actual rotary speed or RPM of the generator G is determined in accordance with the present invention by the element IS and the computed exciting frequency for the exciting current is coupled to the generator stator by means of the power cable PC. The synchronous speed of the generator G can be changed by changing the exciting frequencies coupled thereto. This ability to change the synchronous speed of the generator G permits the synchronous speed to be changed as required by the hydraulic fluid head and fluid flow to optimize the overall efficiency of the turbine generator TG, a feature not presently available in the known prior art. This feature permits the turbine generator TG to be utilized at AC line frequencies that vary with the standard line frequencies in different countries of the world. The selection of the induction generator as the power generator G was further made on the need for the generator to be operative with the operative liquefied gases. The output electrical power is delivered to the output terminals of the cable PC as illustrated in FIG. 1.

It should now be appreciated by those skilled in the art that a submersible turbine electrical power generator has been disclosed wherein the turbine thrust problem is satisfactorily solved by a simple structure and so that the turbine balances out the thrust forces and centrifugal forces generated against the input fluid pressure and imparting variable speeds to the turbine with fixed runner vanes. The radial turbine also has a self-limiting runaway speed by balancing the generated centrifugal forces in the axial runner against the operative fluid pressure and flow useful in submerged turbine generators. The disclosed use of an induction generator driven on the same shaft as the turbine permits the synchronous speed of the induction generator to be changed as dictated by the hydraulic fluid flow and fluid head and to optimize the overall efficiency of the turbine generator.

Although the hydraulic turbine generator is illustrated and described as rotatable in a counter-clockwise direction it is obvious that the turbine generator can be constructed and designed to be rotatable in a clockwise direction. Similarly, although the vertical oreientation of the turbine generator is presently preferred, the turbine generator is operative in other orientations.

I claim:

1. A hydraulic turbine-electrical power generator comprising
    a single shaft assembly for mounting a hydraulic turbine and an electrical power generator thereon, said shaft assembly being bidirectionally axially movable,
    a hydraulic turbine mounted adjacent one end of the shaft,
    a ball bearing mounted on said shaft for said turbine, said power generator comprising an electrical induction generator mounted on said shaft on the opposite side of the ball bearing from said turbine to be rotatably responsive to the rotary movements imparted to said shaft upon the operation of said turbine and in accordance with the speed thereof, a radial bearing mounted to said shaft adjacent the opposite end of said shaft from said one end, said hydraulic turbine including thrust equalizing means mounted to said shaft adjacent said ball bearing, radial runner means rotatably mounted to said shaft adjacent to said thrust equalizing means to be rotatably responsive to a high velocity fluid flow for providing torque to rotate said shaft at a speed in accordance with the hydraulic pressure and velocity of the fluid impinging thereon and discharging the fluid flow at a relatively low velocity and pressure, a common housing means for said hydraulic turbine and said induction generator for enclosing and isolating said shaft between said opposite end of said shaft and said turbine including said thrust equalizing means, said housing terminating adjacent said turbine runner means whereby said runner means and the remaining portion of said shaft is outside said common housing, said ball bearing having an inner race mounted to said shaft and an outer race loosely mounted against said common housing means to permit the shaft to move axially, bidirectionally, relative to said housing a preselected distance, containment vessel means mounted over and in spaced relationship with said common housing and said remaining portion of said shaft and extending axially outwardly of said common housing and remaining portion of said shaft, said vessel having a fluid flow inlet adjacent the radial bearing end of said vessel and a fluid flow outlet at the opposite end thereof, said fluid inlet and outlet being in flow communication with each other so the fluid flow is around said commom housing means, said vessel including nozzle means spaced for receiving the fluid flow from said vessel fluid inlet and converting said fluid flow into a higher velocity fluid flow for impinging on said runner means for rotating said shaft, and exducer outlet means mounted on the remaining portion of said shaft adjacent said runner means to be responsive to the fluid flow discharge from said runner means and to discharge the fluid flow through the vessel outlet at a relatively low velocity and pressure, said thrust equalizing means comprising a stationary thrust plate ring means secured to the common housing adjacent to said ball bearing and extending axially outwardly of said bearing, said runner means including throttling ring means constructed and defined integrally with said runner on one side thereof for coaction with thrust plate for defining a substantially fixed orifice for receiving a portion of said high velocity fluid flow coupled to impinge on said runner means and a variable orifice defined between the throttling ring and the thrust plate and varying in size in accordance with the bidirectional movements of said shaft and receiving said fluid at said variable orifice from said fixed orifice, the fluid conveyed to said variable orifice flows through said ball bearing thereby cooling and lubricating the bearing and into said common housing to thereby cool said induction generator, and conduit means coupled to said common housing adjacent said radial bearing and to the low pressure fluid outlet for said vessel for conveying said coolant liquid to said outlet, said thrust equalizing means including first wear ring means secured to said common housing for coaction with said throttling ring means and second wear ring means secured to said containment vessel for coaction with the discharge end of said runner means, the diametrical spacing of said first wear ring means is constructed and defined to be larger than the diametrical spacing of said second wear ring means for creating thrust forces upon the application of hydraulic fluid thereto effective to cause the shaft assembly to move in response thereto and in a direction therewith until the thrust plate ring means engages said throttling ring means whereby said variable orifice closes and thereby throttles the fluid flow into the variable orifice, the closed condition of the variable orifice defines a chamber between said first wear ring means and the closed variable orifice allowing fluid pressure to build up therein so when the pressure is build up in said chamber to a preselected level sufficient for counteracting said created thrust forces and thereby producing movement of said shaft assembly away from said engaged position of said thrust plate ring means and the throttling ring means and then causing the flow of fluid into the variable orifice accompanied by the reduction of the pressure built up in said chamber whereby the balancing of the generated thrust force occur gradually and smoothly and without overshoot with the bidirectional axial movements of the shaft assembly.

2. A hydraulic turbine-electrical power generator as defined in claim 1 including a variable frequency source of exciting current means connectable to said induction generator for providing electrical frequency output signals in accordance with the sensed rotary speeds of said turbine controlled to generate a constant output frequency from said turbine generator.

3. A hydraulic turbine-electrical power generator as defined in claim 1 or 2 wherein said runner means includes a plurality of runner vanes fixed thereto and having a vane profile for receiving hydraulic fluids between the vanes and causing the fluids to change direction of approximately ninety degrees whereby the discharged fluid from said runner vanes exits with a spin.

4. A hydraulic turbine-electrical power generator as defined in claim 1 or 2 wherein said exducer outlet means comprises a plurality of fixed vanes arranged on a common shaft and having a spiral configuration for receiving the discharged spiral fluid from said runner means for straightening out the fluid flow.

5. A hydraulic turbine-electrical power generator as defined in claim 1 wherein said radial runner means includes a plurality of spaced vanes for receiving the hydraulic fluid flow coupled thereto.

6. A hydraulic turbine-electrical power generator as defined in claim 5 wherein said spaced vanes comprise an even number of equally spaced vanes.

7. A hydraulic turbine-electrical power generator as defined in claim 4 wherein the hydraulic fluid flow discharged from said runner means is further characterized as being discharged having a spin thereto.

8. A hydraulic turbine-electrical power generator as defined in claim 7 wherein said exducer outlet means comprises two axially spaced vanes for straightening out the fluid flow discharged from said runner means.

9. A hydraulic turbine-electrical power generator as defined in claim 1 wherein said nozzle means comprises a plurality of spaced apart nozzles.

10. A hydraulic turbine-electrical power generator as defined in claim 1 wherein said single shaft assembly is mounted in a vertical orientation for completely balancing all of the forces acting on said shaft assembly.

11. A hydraulic turbine-electrical power generator comprising a single shaft assembly for mounting a hydraulic turbine and an electrical power generator thereon, said shaft assembly being bidirectionally axially movable, a hydraulic turbine mounted adjacent one end of the shaft, a ball bearing mounted on said shaft for said turbine, said power generator comprising an electrical induction generator mounted on said shaft on the opposite side of the ball bearing from said turbine to be rotatably responsive to the rotary movements imparted to said shaft upon operation of said turbine and in accordance with the speed thereof, a radial bearing mounted to said shaft adjacent the opposite end of said shaft from said one end, said hydraulic turbine including thrust equalizing means mounted to said shaft adjacent said ball bearing, runner means rotatably mounted to said shaft adjacent said thrust equalizing means to be rotatably responsive to a high velocity fluid flow for providing torque to rotate said shaft at a speed in accordance with applied hydraulic pressure and velocity of the fluid impinging thereon and discharging the fluid flow at a relatively low velocity and pressure, said runner means having a plurality of spaced vanes for receiving said fluid flow and turning it through approximately 90 degrees and discharging the fluid flow axially at a low pressure and velocity, a common housing means for said hydraulic turbine and induction generator for enclosing and isolating said shaft between said opposite end of said shaft and said turbine including said thrust equalizing means, said housing terminating adjacent said turbine runner means whereby said runner means and the remaining portion of said shaft is outside said common housing, said ball bearing having an inner race mounted to said shaft and an outer race loosely mounted against said common housing means to permit the shaft to move axially, bidirectionally, relative to said housing a preselected amount, containment vessel means mounted over and in spaced relationship with said common housing and said remaining portion of said shaft and extending axially outwardly of said common housing and remaining portion of said shaft, said vessel having a fluid flow inlet adjacent the radial bearing end of said vessel and a fluid flow outlet at the opposite end therof, said fluid inlet and outlet being in flow communication with each other so the fluid flow is around said common housing means, said vessel including nozzle means having a plurality of spaced vanes spaced for receiving the fluid flow from said vessel fluid inlet and converting said fluid flow into a higher velocity fluid flow for impinging on said runner means for balancing out the hydraulic pressures generated by the centrifugal forces against said fluid flow and rotating said shaft in accordance therewith, thereby causing the hydraulic turbine to have a self-limiting runaway speed, said thrust equalizing means comprising a stationary thrust plate ring means secured to the common housing adjacent said ball bearing and extending axially outwardly of said bearing, said runner means including throttling ring means constructed and defined integrally with said runner on one side thereof for coaction with the thrust plate ring means for defining a substantially fixed orifice for receiving a portion of said high velocity fluid flow coupled to impinge on said runner means and a variable orifice defined between the throttling ring and the thrust plate and varying in size in accordance with the bidirectional movements of said shaft and receiving said fluid at said variable orifice from said fixed orifice, the fluid conveyed to said variable orifice flows through said ball bearing thereby cooling and lubricating the bearing and into said common housing to thereby cool said induction generator, and conduit means coupled to said common housing adjacent said radial bearing and to the low pressure fluid outlet for said vessel for conveying said coolant liquid to said oulet, said thrust equalizing means including first wear ring means secured to said common housing for coaction with said throttling ring means and second wear ring means secured to said containment vessel for coaction with the discharge end of said runner means, the diametrical spacing of said first wear ring means is constructed and defined to be larger than the diametrical spacing of said second wear ring means for creating thrust forces upon the application of hydraulic fluid thereto effective to cause the shaft assembly to move in response thereto in a direction therewith until said thrust plate ring means engages said throttling ring means whereby said variable orifice closes and thereby throttling the fluid flow into the variable orifice, the closed condition of the variable orifice defines a chamber between said first wear ring means and the closed variable orifice allowing fluid pressure to build up therein so when the pressure is built up in said chamber to a preselected level that counteracts said created thrust forces and for producing movement of said shaft assembly away from said engaged position of said thrust plate ring means and said throttling ring means resulting in a continuous fluid flow into the variable orifice and thereby the continuous reduction of the pressure built up in said chamber whereby the balancing of the generated thrust forces occur gradually and smoothly and without overshoot with the continuous bidirectional axial movements of the shaft assembly during operation of said hydraulic turbine.

12. A hydraulic turbine-electrical power generator as defined in claim 11 wherein said induction generator has a rotor mounted to said shaft and a stator having energizable windings, including a variable speed, constant frequency means connectable to said induction generator stator windings for providing electrical output signals of a frequency in accordance with the rotary speed of said generator for generating a desired constant output frequency from said induction generator with variations in the rotary speed of the generator.

13. A hydraulic turbine-electrical power generator as defined in claim 11 or 12 wherein said shaft assembly is arranged in a vertical orientation.

14. A method of operating a hydraulic turbine-generator including the steps of providing a single rotatable shaft having a hydraulic turbine mounted adjacent one end of the shaft and an electrical induction generator having a rotor and an alternating current exciting field stator for receiving electrical signals of varying preselected frequencies for changing the synchronous speed of said generator mounted adjacent the opposite end of the shaft from said one end, mounting a radial bearing adjacent said opposite end of the shaft and fixed thereto adjacent said generator, mounting a ball bearing on said shaft with said turbine to be axially, and bidirectionally movable thereon over a preselected axial distance, said hydraulic turbine having radial runner means mounted to the shaft for receiving hydraulic fluids having a predetermined high fluid pressure and velocity for rotating said shaft and enclosing said single shaft including the induction generator and the turbine except for said runner means within a single housing with fluid flow communication between a portion of the fluid coupled to said runner means and said single housing conveying a hydraulic fluid of a predetermined high pressure and velocity for impinging against said radial runner means for balancing out the hydraulic pressures of the runner generated centrifugal forces against the injected fluid pressure and creating torque to rotate the shaft at a preselected speed and thereby said generator in accordance with the hydraulic pressure and velocity of said hydraulic fluid and discharging the hydraulic fluid from said runner means at a lower hydraulic pressure and velocity, automatically and continuously balancing out the generator turbine axial thrust forces by causing the thrust forces generated with the application of the high pressure hydraulic fluid to the runner means to cause the shaft assembly to axially move said preselected axial distance in response to the thrust force in the direction of the thrust force, conveying a portion of the hydraulic fluid conveyed to said runner means between said runner means and said housing through said ball bearing to thereby lubricate the bearing and conveyed past the induction generator for cooling the generator, and then conveying said fluid portion to the low pressure side of the discharged runner fluid, after the shaft moves said preselected axial distance, automatically throttling the hydraulic fluid being conveyed to the ball bearing to cause a build up in a fluid pressure between said housing and the runner means until the pressure is built up for counteracting the generated thrust thereby producing a movement of the shaft away from the throttling position so as to reduce the build up of pressure until the shaft movement is reversed and the shaft movements are automatically and continuously reversed whereby the generated thrust forces are balanced out and the turbine operates at essentially zero thrust over the entire usable hydraulic fluid range, and exciting the stator winding of said induction generator with a A.C. current having a frequency selected in accord with the speed of said shaft for producing a preselected output frequency for optimizing the overall efficiency of the turbine generator.

15. A method of operating a hydraulic turbine generator as defined in claim 14 wherein the fluid is discharged as a spiral flow and including the step of straightening out the fluid flow discharged from said radial runner means.

16. A method of operating a hydraulic turbine gnerator as defined in claim 14 including the step of providing containment vessel means mounted over and in spaced relationship with said common housing and said runner means, the containment vessel having a fluid inlet opposite the location of said radial bearing and a fluid outlet at the opposite end, conveying hydraulic fluid at a preselected pressure and velocity into said fluid inlet for said containment vessel to flow around said single housing, and mounting a fluid nozzle in the path of the hydraulic fluid flowing in the containment vessel for receiving the fluid flow and injecting a high velocity flow against said runner means while a portion of the fluid is conveyed between the runner means and the single housing.

17. A thrust equalizing mechanism for use with a hydraulic turbine-electrical power generator mounted on a single shaft as a shaft assembly and a ball bearing mounted intermediate the turbine and power generator in a common housing except the turbine runner is mounted on the shaft outside the common housing adjacent the ball bearing, and a containment vessel enclosing the common housing and the shaft in a spaced relationship therewith, said ball bearing having an inner race secured to said shaft and an outer race loosely mounted against the common housing with a bearing clearance for permitting the shaft to move axially, bidirectionally, a predetermined axial distance, said thrust equalizing mechanism comprising a stationary thrust plate ring means mounted to said housing between the housing and said turbine runner, said runner means including throttling ring means constructed and defined integrally with said runner means on one side thereof for coaction with the thrust plate ring means for defining a substantially fixed orifice for receiving a portion of a high velocity hydraulic turbine flow coupled to impinge on said runner means and a variable orifice defined between the throttling ring means and the thrust plate means and varying in size in accord with said movements of said shaft and receiving the hydraulic fluids at said variable orifice from said fixed orifice, said variable orifice opening being initially greater than said fixed orifice opening, the arrangement and construction of the variable orifice and said thrust plate ring means permits the hydraulic fluid to be conveyed through said ball bearing and through said common housing, said thrust equalizing mechanism further including first ring wear means secured to said common housing and spaced from said throttling ring means and second wear ring means secured to said containment vessel adjacent said fluid discharge end of said runner means, the arrangement and construction of the diametrical spacing of said first wear ring means is defined to be larger than the diametrical spacing of said second wear ring means for creating thrust forces effective to cause the shaft assembly to move axially in the direction of the thrust forces until said thrust plate ring means engages said throttling ring means whereby the variable orifice is closed thereby throttling the hydraulic fluid flow into the variable orifice, said closed condition of said variable orifice defines a chamber between said first ring means and the closed variable orifice allowing fluid pressure to build up therein so when the pressure is build up in said chamber to a preselected level for offsetting the thrust forces created and leading to a movement of said shaft assembly away from said fluid throttling condition and thereby resulting in a continuous fluid flow into the variable orifice and the reduction of the pressure built up in said chamber whereby the balancing of the generated thrust forces occur gradually and smoothly and without overshoot with the continuous bidirectional, alternate axial movements of the shaft assembly, and conduit means coupled to said housing for conveying said portion of the fluid in the housing to adjacent the fluid discharge side of said runner means.

18. A thrust equalizing mechanism for use with a hydraulic turbine-electrical power generator as defined in claim 17 wherein said predetermined axial distance of movement of said shaft assembly due to said bearing clearance is approximately the same as the distance of said variable orifice between said throttling ring and thrust plate ring means.

19. A thrust equalizing mechanism for use with a hydraulic turbine-electrical power generator as defined in claim 17 or 18 wherein said shaft assembly is mounted in a vertical orientation for balancing out all of the forces.

* * * * *